United States Patent [19]

Hafner

[11] Patent Number: 4,777,342
[45] Date of Patent: Oct. 11, 1988

[54] PLASMA CUTTING TORCH WITH IMPROVED ELECTRODE HOLDERS

[75] Inventor: Josef Hafner, Günzburg-Denzingen, Fed. Rep. of Germany

[73] Assignee: Wilhelm Merkle Schweissmaschinenbau GmbH, Fed. Rep. of Germany

[21] Appl. No.: 21,054

[22] Filed: Mar. 2, 1987

[30] Foreign Application Priority Data

Oct. 31, 1986 [DE] Fed. Rep. of Germany ... 8629090[U]

[51] Int. Cl.$^4$ ............................................. B23K 9/00
[52] U.S. Cl. .................. 219/121.39; 219/75; 219/121.52; 219/121.48
[58] Field of Search ............... 219/121 PM, 121 PU, 219/121 PQ, 121 PP, 121 PR, 121 PN, 75, 121 PA; 313/231.21, 231.31, 231.41

[56] References Cited

U.S. PATENT DOCUMENTS

| | | | |
|---|---|---|---|
| 2,858,412 | 10/1958 | Kane et al. | 219/121 PP |
| 3,450,926 | 6/1969 | Kiernan | 219/121 PP |
| 4,127,760 | 11/1978 | Meyer et al. | 219/121 PP |
| 4,311,897 | 1/1982 | Yerushalmy | 219/121 PP |
| 4,521,666 | 6/1985 | Severence, Jr. et al. | 219/121 PP |

Primary Examiner—M. H. Paschall
Attorney, Agent, or Firm—Jones, Tullar & Cooper

[57] ABSTRACT

In the context of a plasma cutting torch of the type comprising a torch nozzle whose two electrode holders, which are adapted to be connected with different poles of a power supply and are coaxially arranged to form a flow path for gas for operation of the torch, an insulating ring, preferably made of ceramic material, is provided to locate the electrode holders in the axial and radial directions. The invention seeks to devise such an arrangement, using simple and low-price means, so that relative motion between the electrode holders and the electrodes is efficiently precluded and in order to achieve this, each of the two electrode holders is provided with ring holding members with axial gripping surfaces which are able to be moved towards each other axially to hold the ring between them, one of the electrode holders being then placed within the ring and the other being placed around it.

15 Claims, 2 Drawing Sheets

PLASMA CUTTING TORCH WITH IMPROVED ELECTRODE HOLDERS

BACKGROUND OF THE INVENTION

The invention relates to a plasma cutting torch comprising a torch nozzle whose two electrode holders are adapted to be connected with different poles of a power supply and are coaxially arranged to form a flow path for gas for operation of the torch, an insulating ring, preferably made of ceramic material, being present between the holders to relatively locate the holders in axial and radial directions.

A plasma cutting torch, having these features, has been proposed in the German unexamined specification Nos. 3,400,281 and 3,400,282. In these earlier designs the two electrode holders were fashioned with steps bearing on the insulating ring at points which were diagonal in relation to the cross section of the ring in such a way that each electrode holder only had one axial bearing surface placed obliquely opposite to the axial support surface of the other electrode holder. Experience since gathered with this set-up has however shown that when it has been heated up relative radial displacement of the two electrode holders, and therefore of the two electrodes (constituting the torch nozzle and the nozzle needle), may take place, owing to the differential thermal expansion of the insulating ring and the electrode holders. The consequence of such relative motion is that the coaxial status of the two electrodes, and thus the precisely centered location of the electrode needle, will be lost. This in turn will lead to increased wear of the electrodes, more especially of the torch nozzle for the one electrode.

SUMMARY OF THE INVENTION

Taking this present state of the art as a starting point, one aim of the present invention is to provide an improved arrangement of the sort initially mentioned.

A further object of the invention is to devise such an arrangement using simple and low-price means that relative motion between the electrode holders and the electrodes is efficiently precluded.

In order to achieve these or other objects of the invention, each of the two electrode holders is provided with ring holding members with axial gripping surfaces which are able to be moved towards each other axially to hold the ring between them, one of the electrode holders being then placed at the inner periphery of the ring and the other being placed at the outer periphery of the ring.

The beneficial effect produced by the invention is more particularly to be seen in the avoidance of the disadvantages of the known devices described. The features of the invention make it possible to ensure that both the electrode holders are able to be clamped separately from each other onto the insulating ring in the axial direction. The clamping action operating in the axial direction may, in accordance with a further advantageous feature of the invention, be such that if heating and accordingly thermal expansion takes place, such expansion being as a rule less at the insulating ring than at the ring holding parts, an even more reliable holding action is ensured. This in turn ensures at the same time that, if there is any radial expansion of the insulating ring, coaxial alignment of the two electrode holders will not suffer in any way. Wear which is likely in the known systems owing to eccentric setting of the electrode needle is advantageously avoided so that one may be certain of a long working life.

In accordance with a useful further development of the invention it is possible for the ring holding parts of each electrode carrier to be provided with cooperating axial screw threads designed for cooperation with each other. The ring holding parts, cooperating in pairs, may then be simply and advantageously screwed on each other, something that provides a reliable holding action and a stepless adaptation of the clamping action. Additionally, these features ensure an extremely simple manufacturing technique and a small overall size.

A further convenient feature of the invention is one in which the ring holding parts able to be screwed onto each other, are provided with flats or the like for the engagement of a spanner or wrench so that they may be reliably tightened up.

Further useful developments and advantageous features of the invention will be gathered from the following account of two working examples thereof as shown in the figures in connection with the claims.

DETAILED DESCRIPTION OF THE PREFERRED EMBODIMENTS

Figure 1:
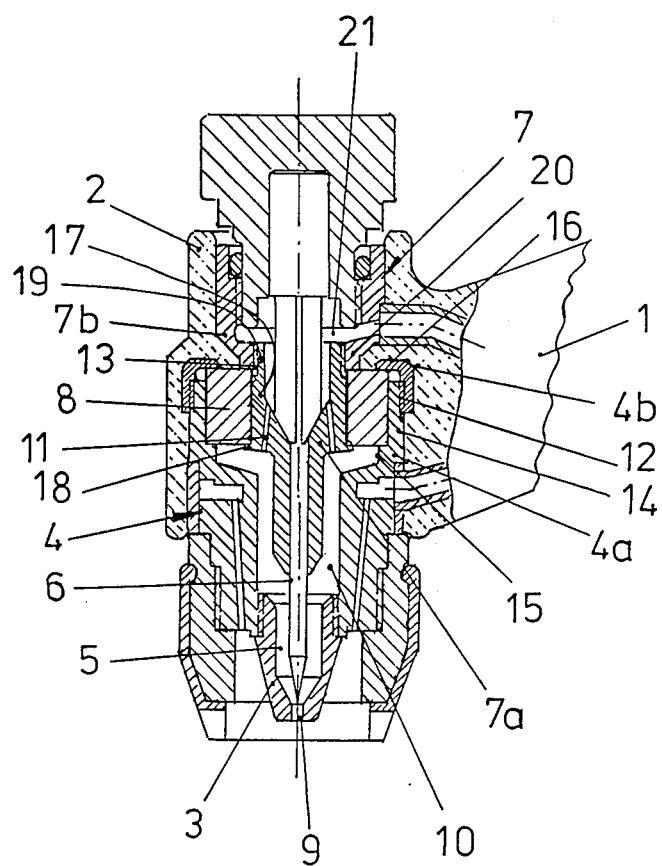
FIG. 1 is a longitudinal section through a first working example of the invention.

The plasma cutting torch shown in FIG. 1 of the drawings comprises a casing 2 which is attached to a handle 1, and in which two mutually electrically insulated electrode holders are set which are connected with different poles of an electrical power supply and take the form of a so-called lower member 4, provided with a cutting nozzle 3 turned towards the work, and a so-called upper member 7 carrying an electrode needle 6, which extends into a coaxial recess 5 in the cutting nozzle 3. For holding the lower member 4 in relation to the upper member 7 there is an insulating ring 8, fashioned of a ceramic material, which is held both radially and axially. At a lower level than the insulating ring 8 there is an annular space 10 which is delimited by the two electrode holders and opens into the recess 5 of the cutting nozzle 3 which is provided with a nozzle bore 9. This annular space conducts the so-called center gas through it. This gas is supplied through a supply duct accommodated in the handle 1, through a distribution duct, placed in the upper member 7, connected with the supply duct and through holes 11 opening into the annular space 10. The gas emerges through the central bore 9 of the cutting nozzle 3.

During the ignition process a pilot arc is produced between the tip of the electrode needle 6, functioning as the one electrode, and the cutting nozzle 3 functioning as the other electrode. This arc is forced outwards by the center gas via the nozzle bore 9 out of the cutting nozzle 3. When the torch is now applied to the workpiece to be cut and which is connected with the same pole as the lower member 4 carrying the cutting nozzle 3, the arc will jump across to the workpiece. It is then possible for the pilot connection of the lower member 4 to be interrupted. At the same time the amperage is stepped up from the original level of the pilot current to the operational level. The center gas may be air. In commercial equipment a mixture of argon and hydrogen or nitrogen is frequently used.

The insulating ring 8 has its radially inner peripheral face adjacent to the upper member 7 extending through it while its radially outer circumferential face is opposite to the lower member 4 which surrounds it. In order to guarantee the maintenance of a precisely coaxial alignment of the nozzle needle 6 despite thermal expansion, the two electrode holders in the form of the lower member 4 and of the upper member 7, with the insulating ring 8 fitted in a radial direction between them, are clamped independently from each other on the insulating ring 8 in the axial direction. For this purpose the two electrode holders in the form of the lower member 4 and of the upper member 7 are split at a position radially adjacent to both the insulating ring 8 so that both adjacent to the lower member 4 and also adjacent to the upper member 7 there are two axially offset ring holding members 4a and 4b or, respectively 7a and 7b. The same are able to be moved axially in relation to each other and to be fixed in relation to each other and furthermore they have axial support faces internally circumferentially adjacently and externally circumferentially adjacently receiving the insulating ring between them and between which the insulating ring 8 may be clamped on the side of the upper member and on the side of the lower side. In the working embodiment illustrated herein the ring holding parts 4a and 4b of the lower member 4 and the holding parts 7a and 7b of the upper member 7 are located directly in relation to each other respectively by means of an axial threaded connection 12 and 13, respectively.

The lower ring holding member 4a, which carries the cutting nozzle 3 and is adjacent to the lower part encompassing the insulating ring 8, possesses a tubular connecting head or sleeve 14, fitted around the insulating ring 8, whose radial support face, turned towards the insulating ring 8, comes to a lower end at a radial, inwardly extending step 15 or shoulder, which comprises the axial support face of the lower member 4, this support face making engagement at the outer ring circumference on the lower end face. At the outer circumference of the circular connecting head 14 there is a peripheral thread forming part of the axial threaded connection 12 and 13 extending as far as the upper edge, onto which the upper ring holding member 4b, remote from the nozzle, of the lower member 4 is able to be screwed. To fulfill this function this upper ring holding member 4b, remote from the nozzle, of the lower member 4 is simply made in the form of a union nut which encompasses the hollow connecting head or sleeve 14, is provided with an internal thread belonging to the threaded connection 12 and 13 and is provided with a collar 16 projecting radially inwards over the radial external circumferential face of the insulating ring 8, such collar thus comprising the axial support face engaging the upper ring end face adjacent to the outer periphery of the ring.

The ring holding part 7a of the upper member 7, which comprises a bushing, extending downwards over the insulating ring 8, for the electrode needle 6, possesses a pin 17 receiving the insulating ring 8 at its inner periphery. The radial bearing surface of this pin 17 comes to an end at a radially outwardly running collar 18, which comprises axial bearing surfaces of the upper member 7 in engagement with the lower radial end face of the ring. The bearing or support faces of the collar 18 and of the step 15 are, in the illustrated embodiment of the invention, placed at the same level as a flat lower ring end face. Adjacent to the side opposite to the collar 18, the pin 17 is provided with a threaded head 19 projecting beyond the insulating ring 8, and this head has an axially extending male thread belonging to the screw connection 13. The upper ring holding part 7b, remote from the nozzle, of the upper member 7, possesses a threaded connector 20 having a female threaded section forming part of the threaded connection 13, the flat end face of the connector 20 (in the form of its flat end face) comprising the axial support face engaging the upper end face of the insulating ring. This axial support face is located at the same level as the support face of the collar 16.

The two ring holding members 4a and 4b and, respectively, 7a and 7b of the lower member 4 and of the upper member 7 are dimensioned so as to be able to be screwed on so far as to ensure a reliable clamping action or non-positive engagement at the axial support faces in engagement with the insulating ring 8. This is achieved by machining to suitable dimension to have (a) the requisite distance between the lower internal shoulder of the connecting sleeve 14 and its top annular face, (b) the appropriate length of the male and female screw threads 12 and 13 on the sleeve 14 and the member 4b, respectively, and (c) the correct position of the ring-engaging, downwardly turned face of the collar. At the upper member 7 this is achieved by having the upper end of the threaded head 19 extending into an annular gas passage 21. In order to be able to reliably tighten up the threaded connector engaging the ring holding parts 4a, 4b and, respectively, 7a and 7b at the coaxially arranged thread connection 12 and 13, respectively, the holding parts may be provided with suitable faces to be engaged by a wrench.

Figure 2:
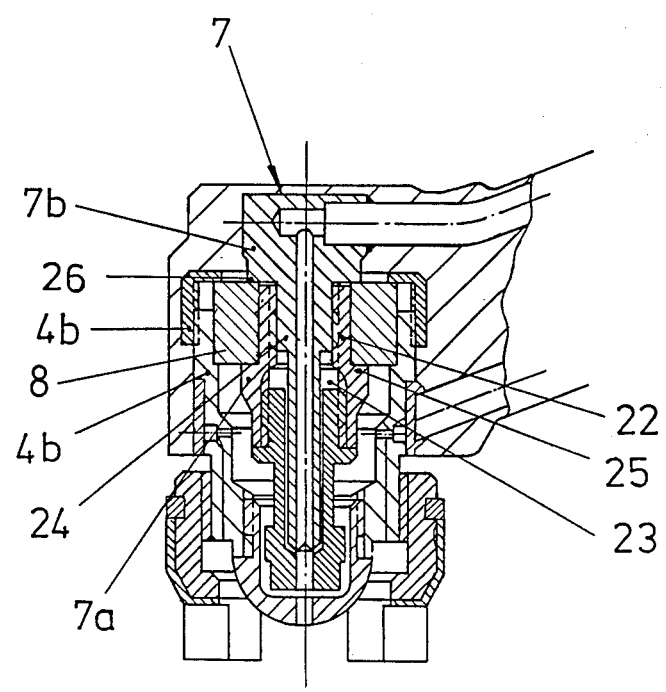
FIG. 2 is a longitudinal section through a second embodiment of the invention.

The basic structure and the workings of the arrangement as shown in FIG. 2 are generally the same as in the embodiment of FIG. 1. The following account is thus limited to the differences relevant for the present purpose, identical reference numerals being employed for like parts.

In this construction, shown in FIG. 2, the lower ring holder part 7a of the upper member 7 extending through the insulating ring 8, has a bushing 22 so placed that its inner periphery is around the insulating ring 8. The bushing 22 has a coaxial threaded hole 23 in which a threaded pin 24 of the ring holding part 7b (remote from the nozzle) of the upper member 7 is screwed. The lower end of the radial support face of the bushing 22 is formed by a radially projecting collar 25, against which the lower end face of the insulating ring 8 bears, adjacent to its internal peripheral face; this collar 25 accordingly comprises the lower axial support face adjacent to the upper member. The upper ring holding part 7b is provided with a rib 26 comprising the associated upper axial support face and extending away radially around and outside the bushing 22. The zone encompassed by the rib 26 in fact forms a groove for the bushing 22, which at this position is able to extend beyond the upper end face of the insulating ring 8. This embodiment of the invention will be seen to be characterizzed by being extremely squat or vertically compact. The ring holding parts 4a and 4b, adjacent to the lower member, correspond to the construction as in FIG. 1 with a connecting head and a union nut.

I claim:

1. A plasma cutting torch, comprising:

first and second electrode holders adapted to be connected with different poles of a power supply;
a cutting nozzle defining a nozzle bore;
said first and second electrode holders being coaxially arranged to form a flow path for gas to flow to the cutting nozzle bore; and
an insulating ring situated between the first and second electrode holders for locating the first and second electrode holders both axially and radially, wherein:
the insulating ring includes axially spaced apart radial faces; and
each electrode holder includes a pair of insulating ring holding members having axially spaced apart radial faces which respectively engage the radial faces of the insulating ring, and means for moving the axially spaced apart radial faces of the ring holding member for axially clamping the insulating ring between the pairs of ring holding members, said ring holding members being radially spaced relative to each other.

2. The plasma cutting torch as claimed in claim 1 wherein said ring holding members are directly positioned in relation to each other.

3. The plasma cutting torch as claimed in claim 1, further wherein the means for moving the axially spaced apart radial faces of the ring holding member comprises coaxially arranged and axially extending threaded connections for connecting the respective ring holding members of each pair together.

4. The plasma cutting torch as claimed in claim 1, further wherein, the cutting nozzle forms one electrode, and one of the pairs of said first and second pairs of insulating ring holding members, which is nearer to said nozzle bore than said other pair of said first and second pairs of insulating ring holding members includes a sleeve-like head surrounding the insulating ring, said head having an axial ring step therein on the nozzle bore side of said insulating ring and a threaded portion and a nut-like part which threadedly engages the threaded portion of said head, said nut-like part being arranged to engage a radial face of said insulating ring remote from said holding step.

5. The plasma cutting torch as claimed in claim 4, further wherein said nut-like part is in the form of a union nut with a collar projecting inwards in a radial direction and having an axial surface thereon for engaging the radial face of the insulating ring remote from said nozzle bore.

6. The plasma cutting torch as claimed in claim 1, further wherein one of the pairs of said first and second pairs of holding members, which is nearer said nozzle bore is in the form of a hollow pin with a collar at its end nearest said bore, said hollow pin being within said insulating ring, said collar thereon having an axial ring clamping surface thereon and being placed at one end of a circumferential surface on said pin for supporting said insulating ring by engaging a bore in said insulating ring.

7. The plasma cutting torch as claimed in claim 6, further wherein at an end of said pin opposite to said pin collar said pin has a male thread for threading into the other holding member of its respective pair of holding members.

8. The plasma cutting torch as claimed in claim 7, further wherein the male thread on said pin projects from the side of said insulating ring remote from said bore and threads into the other holding member which is in the form of a connector with an axial ring holding surface opposite to the pin collar.

9. The plasma cutting torch as claimed in claim 6, further wherein the pin comprises a bushing fitted within the ring, said bushing having a circumferential ring supporting face ending at the outwardly projecting collar for axially supporting the ring, said bushing being internally threaded with the other holding member of its respective pair of holding members being threaded into it, said other holding member of its respective pair of holding members being in the form of a plug and having an axial shoulder thereon.

10. The plasma cutting torch as claimed in claim 9, further wherein said plug has a collar surrounding it, said collar having an axial ring-engaging surface.

11. The plasma cutting torch as claimed in claim 6, further wherein the pin has a threaded part which ends at a chamber of the associated holding member.

12. The plasma cutting torch as claimed in claim 5, further wherein the holding member cooperating with the union nut surrounds said insulating ring, and comes to an end between the side of the insulating ring remote from the bore and the bore.

13. The plasma cutting torch as claimed in claim 1, further wherein said insulating ring holding members are threadedly connected and are provided with surfaces for engagement by a wrench.

14. The plasma cutting torch as claimed in claim 1, further wherein said insulating ring comprises a ceramic material.

15. The plasma cutting torch as claimed in claim 6, further comprising a centrally arranged electrode needle carried by the pair of said first and second pairs of holding members which includes said pin.

* * * * *